United States Patent [19]

Bacher

[11] Patent Number: 5,706,924
[45] Date of Patent: Jan. 13, 1998

[54] CLUTCH INCLUDING A WEAR TAKE-UP DEVICE, IN PARTICULAR, FOR MOTOR VEHICLES

[75] Inventor: Michel Bacher, Andilly, France

[73] Assignee: Valeo, Paris, France

[21] Appl. No.: 619,719

[22] PCT Filed: Jul. 11, 1995

[86] PCT No.: PCT/FR95/00927

§ 371 Date: Jun. 18, 1996

§ 102(e) Date: Jun. 18, 1996

[87] PCT Pub. No.: WO96/03591

PCT Pub. Date: Feb. 8, 1996

[30] Foreign Application Priority Data

Jul. 21, 1994 [FR] France ............... 94 09274

[51] Int. Cl.$^6$ .................................. F16D 13/75
[52] U.S. Cl. ................. 192/111 A; 192/70.25; 192/89.23; 192/89.24
[58] Field of Search ............... 192/111 A, 89.23, 192/89.24, 70.25

[56] References Cited

U.S. PATENT DOCUMENTS 4,207,972  6/1980  Zeidler .
5,186,298  2/1993  Takeuchi ............... 192/111 A
5,564,541  10/1996  Gochenour et al. ............... 192/70.25

FOREIGN PATENT DOCUMENTS 2606477  5/1988  France .
2022729  12/1979  United Kingdom .
2071792  9/1981  United Kingdom .

Primary Examiner—Andrea L. Pitts
Attorney, Agent, or Firm—Longacre & White

[57] ABSTRACT

A Friction clutch including a reaction plate (13, 16), a friction wheel 14 carrying on its outer periphery friction liners (30), a pressure plate (20), diaphragm (24), and a cover plate (17). One of the pressure (20) and reaction (13, 16) plates, includes two coaxial parts axially movably in relation to one another against a wear compensating mechanism (11). The clutch includes a rearming member (1) acted on by a locking member (2) controlled by a trigger (3). A first resilient spring (6) and loose coupling members (8, 80) operate between the rearming member 1 and a rotatable member (4) of the wear compensating mechanism (11). The rearming member (1) is acted on by a second spring (7).

15 Claims, 5 Drawing Sheets

CLUTCH INCLUDING A WEAR TAKE-UP DEVICE, IN PARTICULAR, FOR MOTOR VEHICLES

BACKGROUND OF THE INVENTION

1. Field of the Invention

The present invention relates to a friction clutch, especially for a motor vehicle, and is directed more particularly to a mechanism for compensating for wear in the friction liners, which operates continuously as the said liners become worn, and which thus ensures a clutch travel which remains constant over the course of time.

2. Description of the Prior Art

A conventional friction clutch includes a reaction plate, which may be in two parts so as to constitute a damped flywheel, and which is mounted in rotation on a first shaft, typically a driving shaft such as the crankshaft of the internal combustion engine, and which carries at its outer periphery a cover plate to which at least one pressure plate is attached.

The pressure plate is fixed to the cover plate and reaction plate, for rotation with them, but it is able to be displaced axially under the biasing action of axially acting resilient means which are generally controlled by a metallic diaphragm which bears on the cover plate, while a friction wheel which carries the friction liners at its outer periphery, and which is fixed to a shaft, typically a driven shaft such as the input shaft of the gearbox, for rotation with the latter, is interposed between the pressure plate and the reaction plate in such a way as to be gripped between them when the clutch is in its engaged position.

The diaphragm controlling the axial movement of the pressure plate is actuated by a clutch release bearing which slides axially.

Over the working life of such a clutch, the friction liners, and also the materials against which they engage (i.e. the pressure plate and the reaction plate) become worn, which causes the gripping force between the friction wheel on the one hand, and the pressure and reaction plates on the other hand, to vary as a result of the modifications in the working conditions of the diaphragm.

The clutch travel also varies, as does the force which necessary for disengaging the clutch.

It is known from the document U.S. Pat. No. 4,207,972 to provide a wear compensating device in which a first plate, which is in fact the pressure plate, is in two coaxial parts, one of which is displaceable axially with respect to the other in such a way that the overall thickness of the first plate has a tendency to increase to the extent that the thickness of the friction liners diminishes, so that the working conditions of the diaphragm consequently do not vary.

In that document, the coaxial elements of the first plate are displaceable axially one with respect to the other against the action of a device or mechanism for compensating for wear in the above mentioned friction liners.

The said device includes ramp means which are carried in a complementary manner by two members, one of the members being fixed against rotation while the other member is rotatable.

Initiation of the movement of the said members is controlled by a trigger which is responsive to the state of wear of the friction liners. The said members work between the two parts of the first plate.

Such a device enables wear in the friction liners to be taken up continuously.

However, under severe operating conditions, the pressure plate becomes heated, as do the remainder of the components of the clutch, so that a singular point is passed through with compensation for wear, the pressure plate becoming deformed into a conical shape.

An object of the present invention is to overcome this drawback.

SUMMARY OF THE INVENTION

According to the invention, a clutch of the type described above is characterised in that it includes a rotatable rearming member associated with one of the parts of the first plate and subjected to the action of locking means which are controlled by the trigger, in that first circumferentially acting resilient means and loose coupling means are interposed between the rearming member and the rotatable member of the wear compensating mechanism, and in that the rearming member is subjected to the action of second circumferentially acting resilient means working against the first resilient means and interposed operatively between the rearming member and one of the parts of the first plate.

Thanks to the invention, the rearming member is armed while the clutch is in its engaged position with the liners worn, and wear is then taken up through a predetermined angle by the loose coupling means during the disengagement of the clutch. With a diaphragm clutch, the accumulation of energy of the latter is made use of in arming the system, the clutch being engaged. Singular points are thus avoided, since the wear compensating device works in a continuous manner through a predetermined angle. The operation of taking up wear is initiated with the clutch in its engaged position.

The second resilient means are chosen in such a way as to overcome the action of the first resilient means. Accordingly, they exert a higher torque on the rearming member, their force being for example greater than that of the first resilient means.

The wear compensating device is preferably disposed at the level of the reaction plate, the latter comprising two coaxial parts.

This wear compensating device is arranged at the inner periphery of the reaction plate proper, which offers a friction surface for engagement by the friction wheel.

The wear compensating device is accordingly located in a relatively cool position, and the clutch mechanism, and in particular the pressure plate, remains unchanged. In addition, the inertia of the arming member is reduced, and good ventilation can be obtained.

In one embodiment, the locking means consist of a brake which prevents rotation of the rearming member.

In a modified version, locking may be obtained by mating cooperation. For example, the locking member may have lugs which cooperate with lugs formed in the arming member.

The locking means preferably include a resilient tongue which is acted on by the trigger.

In one embodiment, this trigger is mounted for sliding movement in the reaction plate proper, mentioned above, and is adapted to act on the tongue, being itself acted on by the pressure plate.

Thus, as the friction liners become worn, the pressure plate moves closer to the reaction plate proper, in such a way that at the end of a certain course of travel, it acts on the trigger, which in its turn acts on the tongue of the locking means so as to release the latter.

The rearming member (the clutch being engaged) can then be displaced in rotation so as to arm the wear compensating device for movement through an angle which is predetermined by the loose coupling means.

In a modified version, the wear compensating device is located at the level of the pressure plate.

In that case, the cover plate or the diaphragm is arranged to act on the tongue of the locking means in order to unlock the latter.

Preferably, the cover plate has an abutment lug for this purpose.

The following description illustrates the invention with reference to the attached drawings, in which:

DETAILED DESCRIPTION OF THE PREFERRED EMBODIMENT

Figure 1:
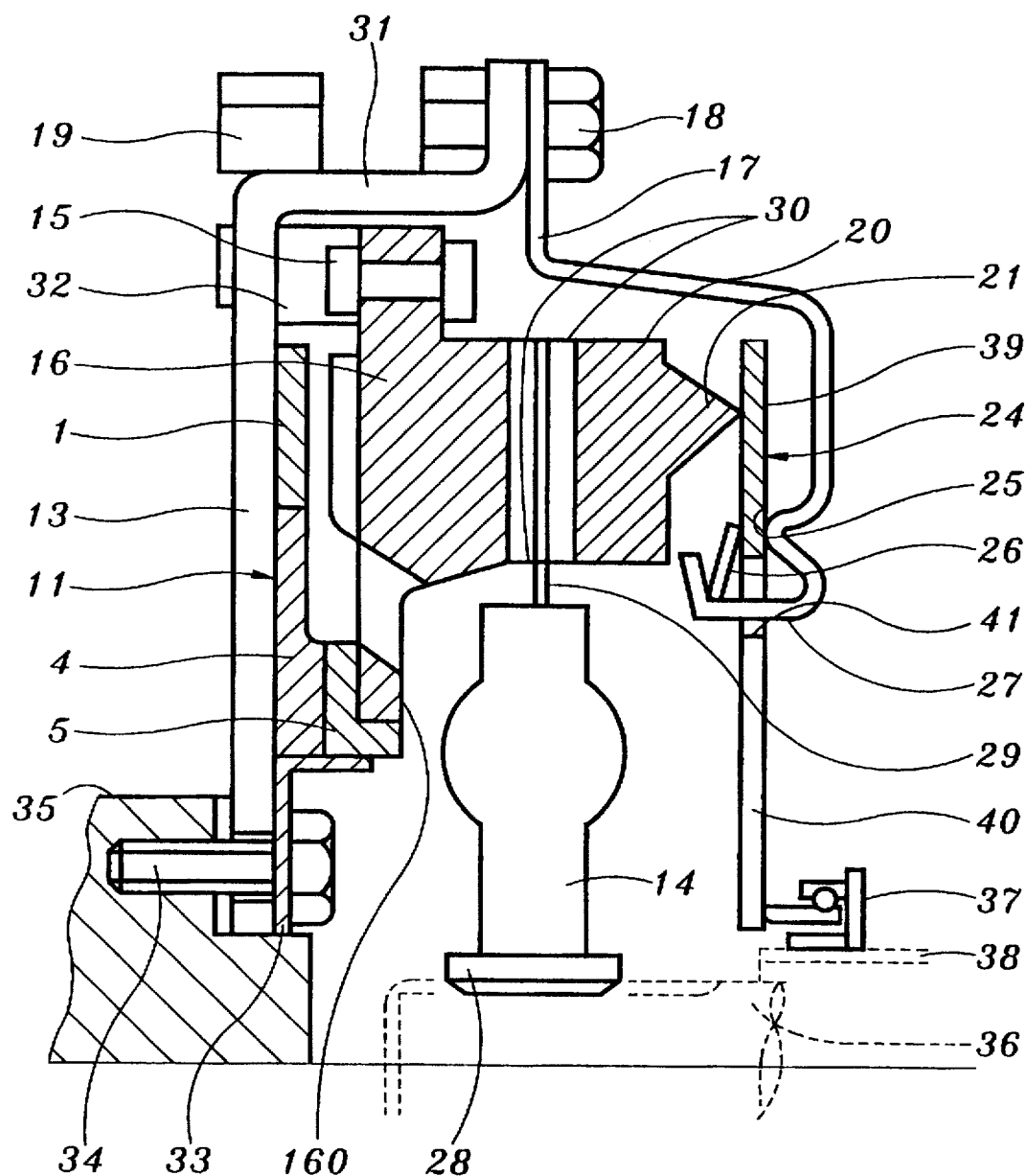
FIG. 1 is a view in axial cross section of a clutch having a wear compensating device.

FIG. 1 shows a diaphragm clutch for a motor vehicle. This clutch includes, in axial succession, a reaction plate in two parts 13, 16, a clutch friction wheel 14, a pressure plate 20, a diaphragm 24, and a cover plate 17.

The reaction plate 13, 16 is arranged to be carried on a driving shaft, which in this example is the crankshaft 35 of the internal combustion engine, for rotation with the latter, while the friction wheel 14 is coupled, either resiliently or rigidly, to a hub 28 which is carried on the shaft 36 of the gearbox for rotation with the latter.

The friction disc 14 has at its outer periphery a support disc 29 carrying friction liners 30 fixed on each of its faces.

The pressure plate 20 is fixed to the reaction plate 13, 16 and the cover plate 17, for rotation with these components.

More precisely, the assembly consisting of the pressure plate 20, diaphragm 24 and cover plate 17 constitutes a unitary assembly referred to as the clutch mechanism, which is carried, through the radial flange of its cover plate 17 which is in the form of a hollow dish, on the reaction plate 13, 16.

In this example, the pressure plate 20 is coupled in rotation to the cover plate in a manner known per se, through interposed tangential tongues 23 which are fixed at one of their ends to a zone of the radial flange of the cover plate, by means of fastening members (not shown), and which are fixed at their other ends to a projecting radial lug 22 of the pressure plate 20 by means of fastening members 12, which in this example are in the form of rivets.

The diaphragm 24, which in its relaxed state is of frusto-conical form, is mounted for pivoting movement on the cover plate 17.

More precisely, the diaphragm 24 includes a peripheral portion 39 in the form of a Belleville ring, together with a central portion which is divided into radial fingers 40 by slots. These slots are open at one of their ends into the central aperture of the diaphragm, and at their other end, at the inner periphery of the Belleville ring 39, into an enlarged aperture 41.

The base portion of the cover plate is press-formed with an asperity 25 which constitutes a primary abutment for the diaphragm 24.

Fastening lugs 27, formed integrally by bending and press forming, project from the inner periphery of this base portion, with each of the lugs 27 extending axially through one of the above mentioned apertures 41, and has at its free end a portion which is bent radially away from the axis of the assembly, so as to define a locating bend on which a frusto-conical crown ring 26 is mounted, the latter providing a secondary abutment aligned with the primary abutment 25.

More precisely, the outer peripheral portion of the Belleville ring 39 of the diaphragm 24 bears on a divided projecting element 21 of the pressure plate 20, while at its inner periphery the Belleville ring 39 is gripped between the primary abutment 25 and the secondary abutment 26.

The clutch is normally engaged, and the friction liners 30 are clamped between the pressure plate 20 and the portion 16, described later herein, of the reaction plate 13, 16. For this purpose, the diaphragm 24 bears on the secondary abutment 25 and on the projecting element 21 of the plate 20, so as to bias the pressure plate 20 towards the reaction plate 16.

The friction liners are thus gripped between the pressure and reaction plates. When the liners 30 are new, the diaphragm 24 is generally flat (FIG. 1). In order to disengage the clutch it is necessary to act on the ends of the fingers 40 of the diaphragm 24, with the aid of a clutch release bearing indicated diagrammatically at 37.

In a manner known per se, the clutch release bearing is subjected to the action of a control member, such as a declutching fork or the piston of an hydraulic actuator, and has an actuating element, which is typically in the form of a ball bearing, one of the rings of which is extended so as to make contact with the fingers 40 of the diaphragm.

The release bearing 37 is mounted for sliding movement along a guide tube 38 which is fixed to the casing of the gearbox (not shown) and which surrounds the input shaft 36 of the gearbox.

Thus, by exerting a thrust on the ends of the fingers 40 with the aid of the release bearing 37, the diaphragm is caused to deflect pivotally, so that it then bears on its secondary abutment 25, the effect of which is to cancel the force exerted by the diaphragm on the pressure plate 20; the tongues 23 urge the plate 20 towards the base portion of the cover plate 17.

The friction liners 30 are thus released, and the clutch is disengaged.

In this example it will be noted that the cover plate 17 is fixed by means of the threaded fasteners 18 on the portion 13 of the reaction plate 13, 16 described later herein.

Thus, as the friction liners 30 become worn, the pressure plate 20 moves closer to the reaction plate 16, so that the inclination of the diaphragm 24, and therefore the force exerted by the said diaphragm 24 on the plate 20, varies. The position of the release bearing 36 also changes.

In order to overcome this effect, a wear compensating device or mechanism 11 is provided, this being mounted within the clutch and working in a continuous manner.

This wear compensating mechanism works between two coaxial parts which are defined by a plate which is either the pressure plate or the reaction plate, and which is referred to for convenience as the first plate.

This mechanism for compensating for wear in the above mentioned friction liners 30 includes ramp means 90, 91. The two coaxial parts of the first plate are coupled, through interposed coupling means, for rotation together, while one of them is movable axially with respect to the other.

Initiation of this movement of the said parts is controlled by a trigger 3 which is responsive to the condition of wear of the friction liners 30.

For this purpose, the mechanism 11 comprises two members 4, 5. One of these, 5, is fixed in rotation while the other one, 4, is rotatable. Each of these members carries complementary ramp means, for example of the helical type, which are associated with one of the parts of the first plate. The components of the compensator therefore work between the two parts of the first plate.

More precisely, in accordance with the invention, a clutch having a wear compensating mechanism of the type mentioned above is characterised in that it includes a rotatable rearming member 1 which is associated with one of the parts of the first plate 13, 16 or 20, and which is acted on by locking means 2 which are controlled by the trigger 3, in that circumferentially acting first resilient means 6 and loose coupling means 8, 80 are operatively interposed between the rearming member 1 and the rotatable member 4 of the wear compensating mechanism 11, and in that the rearming member 1 is acted on by second circumferentially acting resilient means 7 which work against the first resilient means by operating between the rearming member 1 and one of the parts, namely the part 13, of the first plate 13, 16, 20.

The locking means 2 prevent the rearming member 1 from turning. They are so dimensioned as to resist both the force exerted by the spring 6, and the inertia forces which are exerted on the rearming member 1.

The second means 7 are so chosen as to overcome the action of the first means 6. They exert a greater torque on the rearming member. In this example the second resilient means have a force greater than that of the first resilient means, and work against the latter.

In this example (FIG. 1), the wear compensating means are interposed within the reaction plate 13, 16. The reaction plate comprises a support plate 13 which carries at its outer periphery a starter crown 19, which is arranged to be driven by the starter of the vehicle. It also includes a reaction plate 16 proper. The reaction plate 13, 16 thus comprises two coaxial parts 13, 16, the plate 16 being movable axially with respect to the support plate 13 in a manner to be described below.

This plate 13, which is of metal in this example, has at its outer periphery an axially orientated cylindrical skirt portion 31, the free end of which has a radial flange which extends away from the axis of the assembly.

It is on this flange that the cover plate 17 is fitted by means of the threaded fasteners 18.

The support plate 13 is centered internally and fixed on the crankshaft by means of threaded studs 34, as can be seen in FIG. 1.

A centering member 33 is interposed between the heads of the studs 34 and the corresponding face of the support plate 13.

This member 33 has at its outer periphery an axially orientated annular flange which centers the rotatable member 4 of the wear compensating device.

The reaction plate 16 proper, which in this example is a casting, has a friction surface for engagement with the appropriate friction liner 30 of the friction wheel 14.

The plate 16 is coupled in rotation to the support plate 13 through tangential tongues 32, in the same way as the pressure plate 20 is coupled to the cover plate 17.

To this end, the tangential tongues 32 are fixed at one of their ends to the support plate 13 by means of fastening members,' and at their other end to a radial lug of the plate 16, which in this example is a casting, by means of fastening members 15 which in this example are rivets.

The plate 16 is thus able to be displaced axially with respect to the reaction plate 13, while being coupled to the latter, for rotation with it, by means of the tongues 32. In this example there are several sets of tongues 32, which are spaced apart at regular intervals circumferentially.

These tongues are preferably adapted to develop an axial force which is such as to ensure the axial stacking of the assembly of the system.

In a modified version, a coupling of the tenon and mortice type could be provided, with the skirt portion 31 then having longitudinal apertures, with a lug of the plate 16, constituting a tenon, being engaged in each of these apertures.

In that case, a spring is preferably provided so as to ensure that the stack consisting of the components which constitute the compensator is held together.

The plate 16 is extended at its inner periphery by an annular, transversely orientated, collar portion 160 which serves for fastening one of the pieces, 5, of the mechanism 11 carried on the said collar portion. In a modified version, the member 5 may be integral with the plate 16, being formed by moulding with the latter.

It will be noted that the collar portion 160 is relieved locally so as to provide ventilation of the space which is defined by the support plate 13 and the plate 16.

Profiles adapted to provide ventilation may also be provided between the plate 16 and the member 5.

The rearming member 1 is mounted in this space. The said member is thus interposed between the plate 13 and the plate 16, being in contact with the plate 13 and associated with the latter.

The said member 1 surrounds the rotatable member 4 of the device 11, centered by the member 33. More precisely, the members 4 and 5 are of stepped, tubular form. The member 5 has a cross section in the form of an inverted L, and has a tubular portion 92 of reduced diameter which carries a pin 96 for locating it in rotation on the collar portion 160.

The member 5 is preferably made of a synthetic material, as is the member 4.

Figure 3:
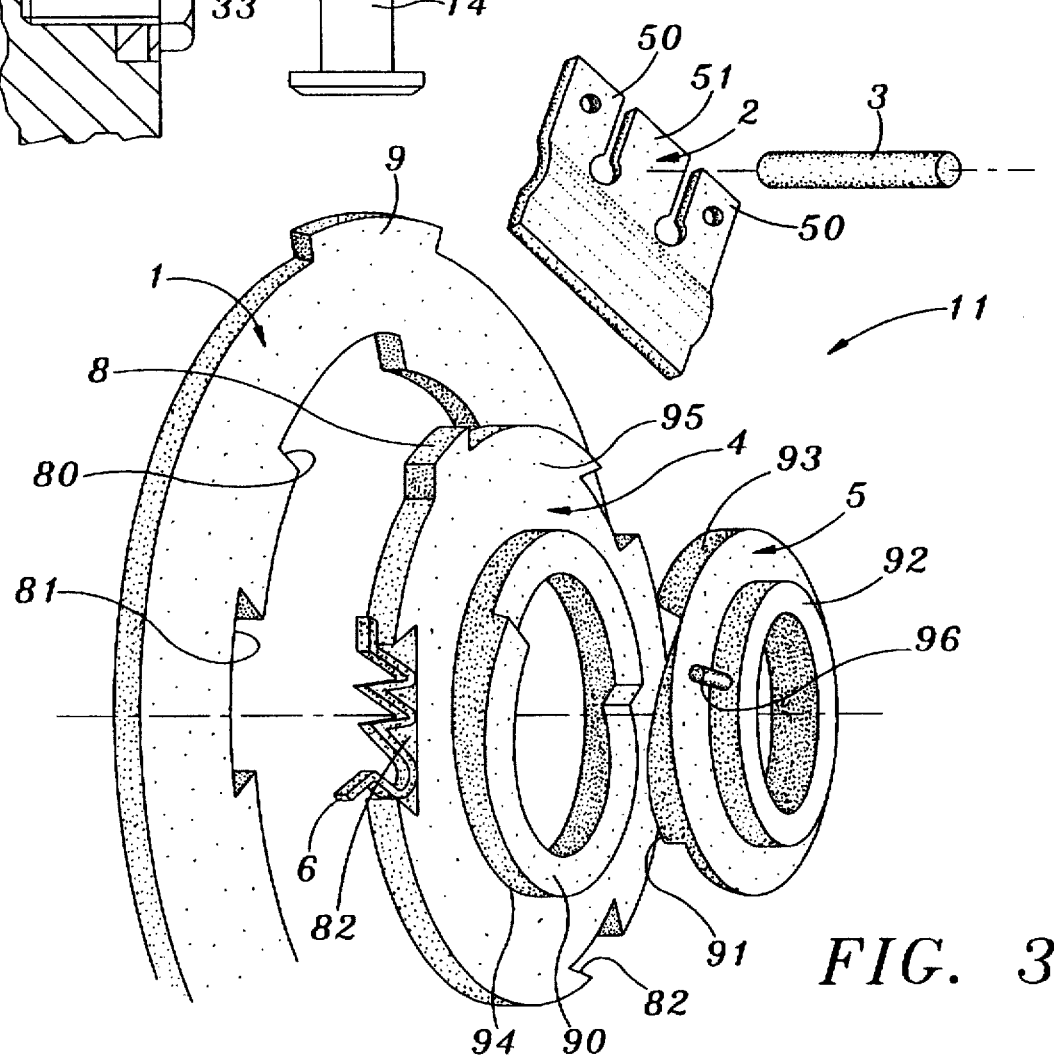
FIG. 3 is a partial view in perspective, showing the trigger, the locking device, the arming member, and the wear compensating mechanism in accordance with the invention.

The member 5 has a tubular portion 93 (FIG. 3) of enlarged diameter, the front surface or edge of which includes part of the ramp means. These ramp means consist in this example of at least two sectors 91 which define helical ramps. In this example three sectors are provided.

The said member 5 is fixed in rotation to, but movable in straight line movement with respect to, the plate 16, to which it is abutted and with which it is associated.

In a modified version not shown, the member 5 is integral with the plate 16.

The member 4 has a tubular portion 94 of reduced diameter, the size of which is complementary to that of the portion 93 of the member 5. The front edge or front face of the said portion 94 defines the other part of the ramp means, which in this example comprise three ramps 90, the profile of which is complementary to the ramps 91. The tubular portion 95, of enlarged diameter, of the said member 4 has notches 82, together with a radial lug 8, at its outer periphery. The notches 82 have a truncated trapezoidal profile, with a flat base and two inclined sides.

The member 4 is fixed against axial movement, but is movable in rotation.

The disc-shaped rearming member 1 has at its inner periphery notches 81 the profile of which is similar to that of the notches 82, but which are inclined in the opposite direction.

In this example there are three notches 81 and three notches 82, which are spaced apart circumferentially on a circle and which are in facing relationship with each other. Corrugated springs 6, with end portions in the form of a dihedral, are mounted in the said notches 81, 82, which define a corresponding dihedral at each of their circumferential ends.

These springs 6 constitute the first circumferentially acting resilient means in accordance with the invention.

The portion 95 of the member 4 has at its outer periphery a radially projecting tooth 8 which penetrates, with a predetermined circumferential clearance, into a notch 80 formed at the outer periphery of the rearming member 1.

This arrangement defines loose coupling means 8, 80 which are interposed, in accordance with the invention, between the member 4, which will be referred to hereinafter as the adjusting ramp, and the rearming member.

The said rearming member is acted on by second circumferentially acting resilient means 7, which in this example consists of a simple coil spring fixed at one of its ends to the member 1 and at its other end to the support plate 13. This arming spring 7 is inclined in such a way that it works in the circumferential direction.

It tends to cause the member 1 to rotate in a clockwise direction, and it exerts on the member 1 a force greater than that of the first resilient means 6 which constitute resilient disengaging means.

The spring force of the resilient means 7 is greater than that of the resilient means 6. In particular, this result can be obtained by arranging that the stiffness of the spring 7 is greater than that of the springs 6.

The member 1 is clamped at its outer periphery between the plate 13 and a member 2 in the form of an elastic brake. This member 2 is part of the locking means in accordance with the invention, and includes at its outer periphery a central declutching tongue 51, which is flanked by two resilient fastening lugs 50, each of which is formed with a through hole through which there passes a fastening member such as a rivet 52 (FIG. 2), for fastening the brake 2 to the plate 13.

The inner periphery of the said member 2, which in this example is of metal, has a press-formed zone, which is rounded in this example, for gripping the member 1 in point contact. The said member 1 is thus clamped elastically between the plate 13 and the member 2.

Figure 2:
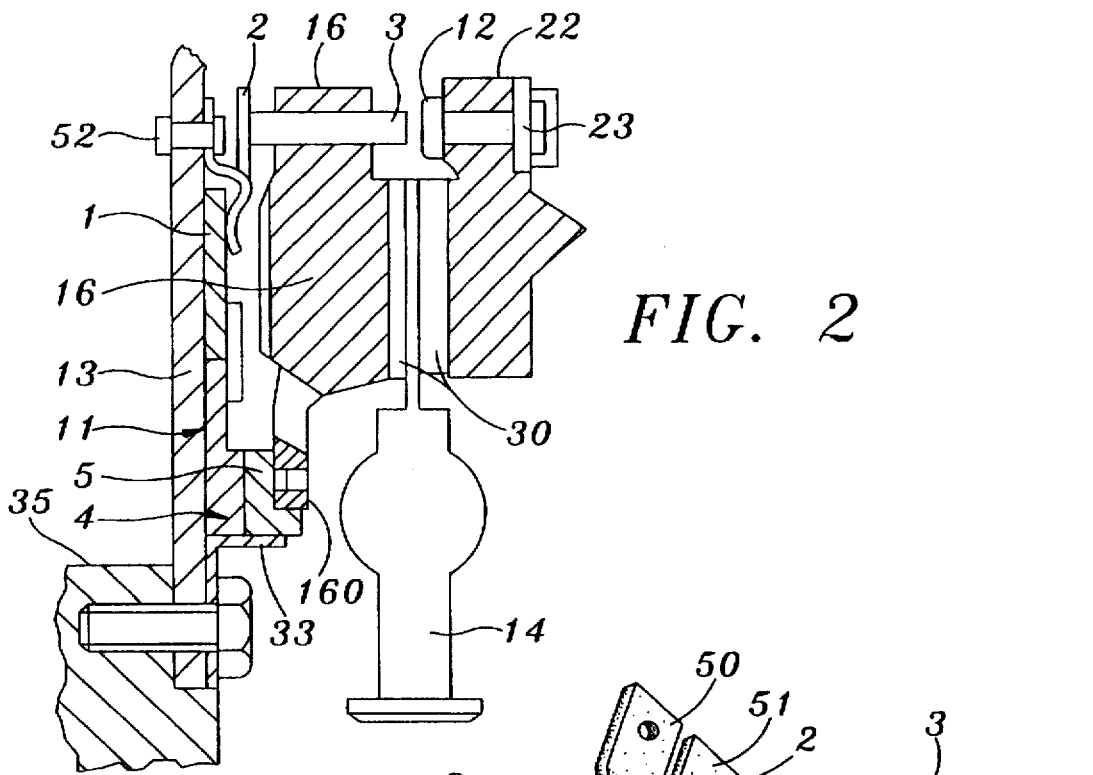
FIG. 2 is a view similar to FIG. 1 without the cover plate and part of the support plate of the reaction plate, and showing the trigger and the locking means.

It will be noted that the rearming member 1 is mounted for rotation on the outer periphery of the member 4. The trigger 3 consists of a pin which is mounted so as to extend through an associated bore formed for this purpose at the outer periphery of the plate 16 (FIG. 2).

In practice, a "mecanindus" pin (not shown) is interposed between the above mentioned bore of the plate 16 and the pin 3, being such that the said pin 3 is mounted so that it is elastically gripped.

One of the ends of the pin is arranged to act on the tongue 51 of the brake 2, while the other end of the pin 3 is arranged to make contact with the rivet 12 by which the tongues 23 are fixed.

Thus, the head of the rivet 12, being fixed to the pressure plate 20, is adapted to interact with the pin 3.

The trigger is normally in contact with the tongue 51, and there is a clearance between the rivet 12 and the pin 3. The arming member is thus locked.

When the friction liners 30 become worn, the pressure plate 20, and therefore the rivet 12, come closer to the pin 3.

Figure 4:
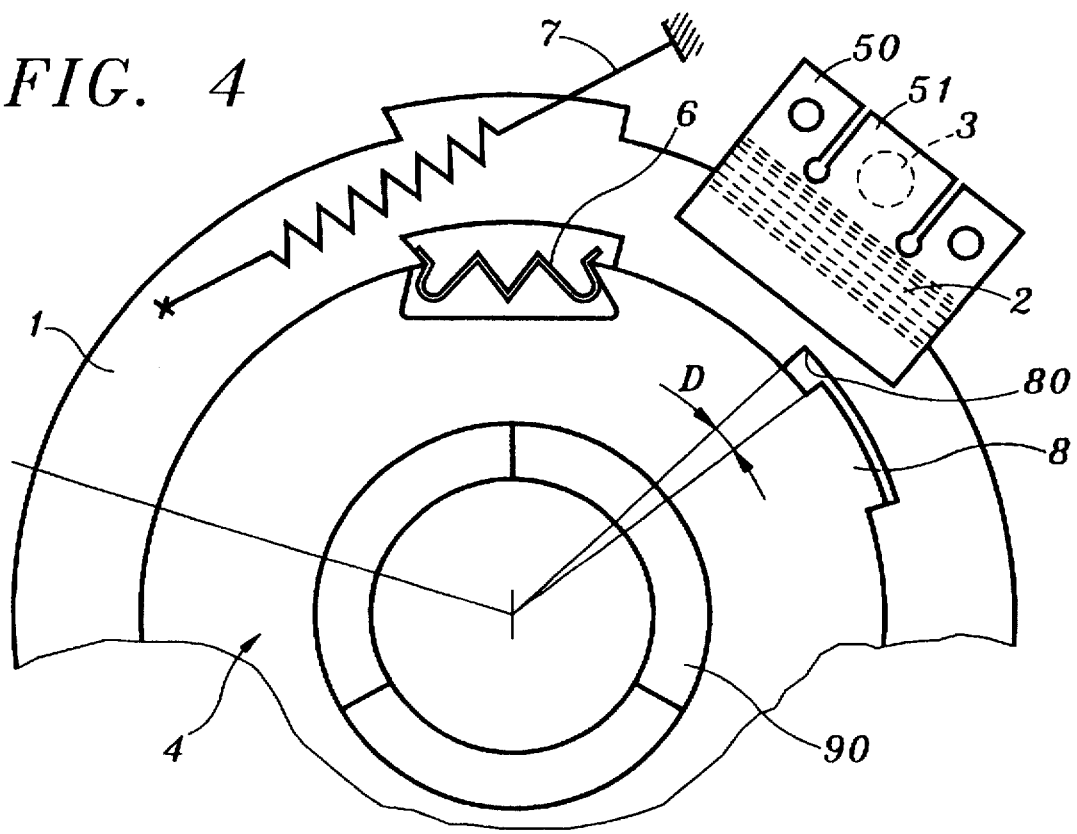
FIG. 4 is a view similar to FIG. 3, showing the normal state of the wear compensating device after wear has been taken up.

After wear has been taken up, or when the friction wheel is new, the configuration is as shown in FIG. 4, the clutch being engaged.

In this case, the spring 6 works in the clockwise direction, and the lug 8 is abutted against one of the circumferential ends of the notch 80, there being an angle α (FIG. 4).

In this configuration, the member 1 is fixed because it is clamped by the brake 2, in such a way that the spring 7 exerts no force on the spring 6, and the member 1 constitutes a fixed stop member for the springs 6.

When the liners 30 become worn, the head of the rivet 12 acts on the pin 3, which acts on the resilient tongue 51 and releases the brake in the clutch engaged position.

In that event, the rearming member 1 (FIG. 5) rotates in the clockwise direction under the action of the spring 7, with the spring 6, having a weaker spring force, being compressed because the member 4 is then fixed since the clutch is engaged.

Figure 5:
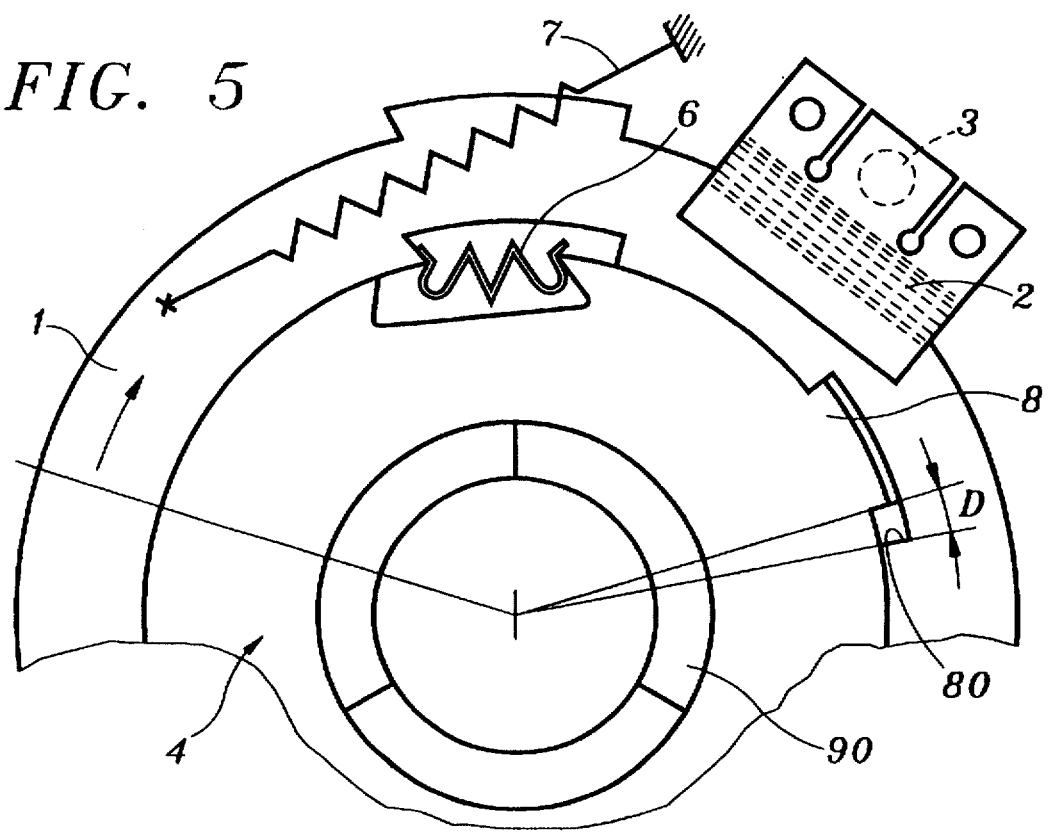
FIG. 5 is a view similar to FIG. 4, showing the wear compensating device in the state in which the clutch is engaged, after the friction liners have become worn, and after being armed.

In this way, the configuration of FIG. 5 is reached, in which the angle α is present between the other edge of the lug 8 and the other edge of the notch 80.

Thus rotation through a predetermined angle α has taken place while the clutch is engaged, with the members 4, 5 accordingly being immobile.

The wear compensating mechanism is thus armed, in a value which is determined in advance, the springs 6 being compressed.

Figure 6:
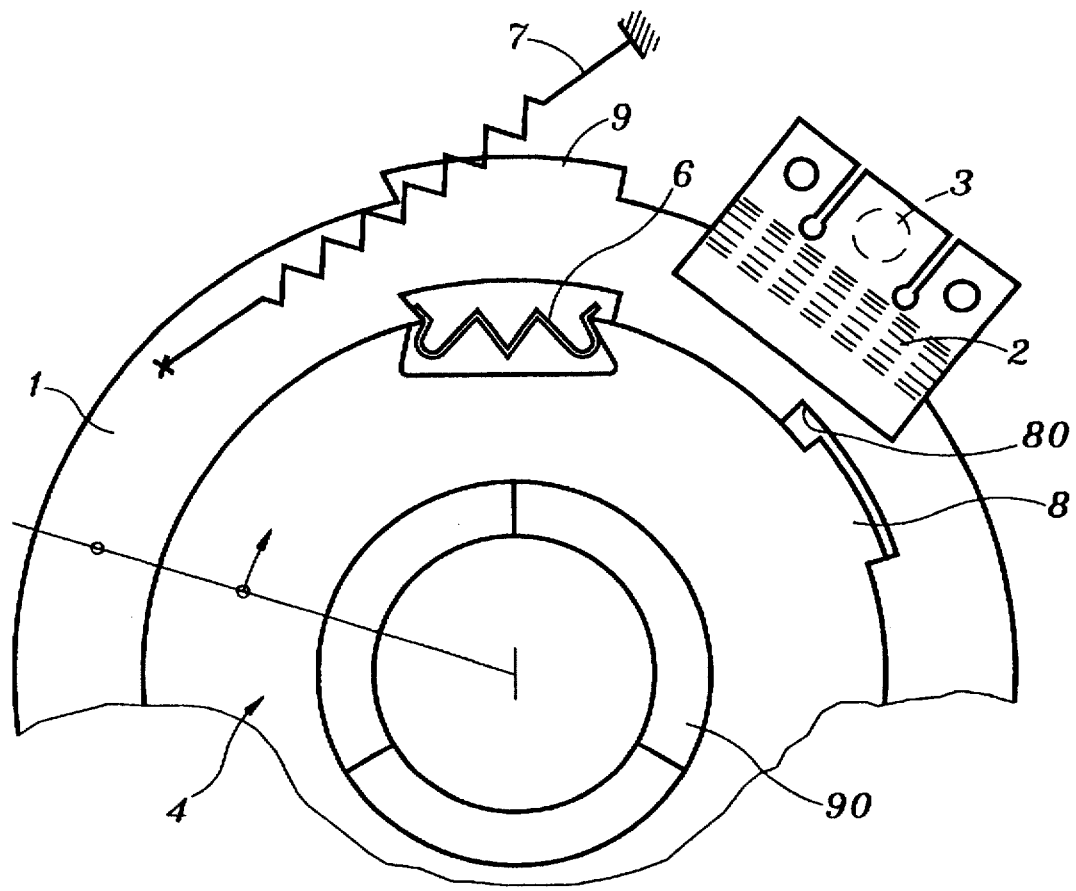
FIG. 6 is a view similar to FIG. 5, showing the wear compensating device in the declutched state, after the play has been taken up.

When the clutch is disengaged, the distance between the plate 13 and the plate 16 can increase in such a way that the member 4 rotates through an angle α (FIG. 6).

In this connection, in that position the rearming member is fixed, being once again gripped by the brake 2 because the pressure plate is spaced away from the pin 3, which enables displacement to occur only through an angle α.

The member 4, referred to as the adjusting member, thus rotates through an angle α from its FIG. 5 position, and the springs 6 are expanded.

Thus, thanks to the invention, a limited rotation takes place between the members 4 and 5.

It will be noted that these members 4, 5 are only able to rotate in one direction, because of the angle of friction of the ramps 90, 91, which is chosen with this in view.

Thus, under severe operating conditions of the clutch, wear will only be taken up through an angle α. In this way, all singular points, and all points of excessive compensation, are avoided.

The low inertia of the rearming member, fitted under precompression, will be noted. Its inertia has no influence on the rearming operation, because of the springs 6, 7 which are loaded accordingly.

Figure 7:
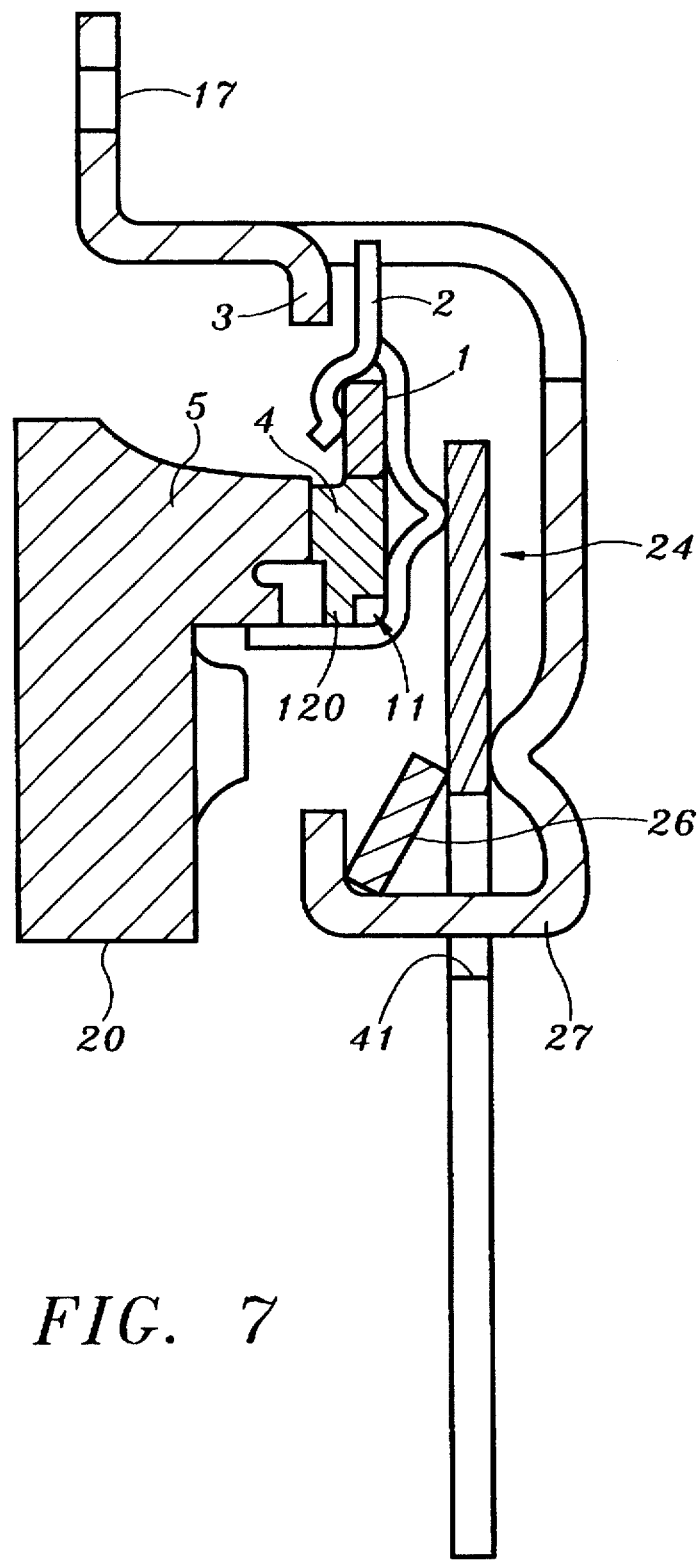
FIG. 7 is a diagrammatic view showing the location of the wear compensating device of FIG. 1 at the level of the pressure plate.

It is of course possible to fit the wear compensating device at the level of the pressure plate 20 (FIG. 7).

The latter accordingly has on its rear face a ramp portion 5, the end of which defines ramp means as in FIG. 1. This member is therefore fixed against rotation but movable in the axial direction.

The member 4 is enabled to make contact with the member 5, and also has ramp means, which in this example are of the helical type like those of the member 4.

In this example, a member 120 is mounted in rotation on the plate 20, being movable axially with respect to the latter. The member 120 has for this purpose an axially oriented portion which slides in grooves formed in an internal bore of the plate 5.

To this end, the member 120 is in the form of a comb at its free end, such that a splined coupling is formed between the plate 20 and the member 120 which is centered by the plate 20. The said member provides an abutment for the diaphragm 24, and is extended at its outer periphery so as to carry the brake 2. The rearming member is then clamped at its outer periphery between a transverse portion of the member 120 and the brake 2.

The rearming member is mounted for rotation on the member 4 as in FIGS. 1 to 6, with springs 6 and 7, not shown, being interposed.

It will be noted that the member 120 centers the member 4 and carries the members 1, 4, 6, 7, 2.

In this example the trigger is constituted by a lug 3 which projects from the cover plate and which is formed by press forming and bending.

As the liners become worn, the plate 20 is displaced closer to the lug 3, and the brake 2 then comes into abutment, through its resilient tongue, against the lug 3, which releases the brake 2.

In a modified version, the trigger could be constituted by the diaphragm. In that case, the brake 2 includes an axial portion which is arranged to cooperate with the diaphragm.

The device operates then in the same way as that in FIG. 1.

It will however be appreciated that the wear compensating device of FIG. 1 does not call for any modification of the clutch mechanism 20, 24, 17, and that it is located in a less hot position. In addition, the inertia of the rearming member 1 is reduced, which has the least possible effect on operation.

By contrast, the device 11 in FIG. 7 is located in a hotter position.

The present invention is of course not limited to the embodiment described. In particular, the clutch may be of the pull-to-release type, with the diaphragm then bearing on the cover plate through the outer portion of its Belleville ring, and bearing through the inner periphery of its Belleville ring on the projecting element of the pressure plate. In this case it is necessary to work in traction on one end of the fingers of the diaphragm in order to release the clutch.

In a modified version, instead of a diaphragm it is possible to make use of axially acting resilient means in the form of coil springs acting on the base portion 17 of the pressure plate 20, and any type of mechanical and/or hydraulic gripping means may also be employed.

These springs are then acted on by declutching levers.

It will be noted that the rearming member 1 further includes, at its outer periphery, a lug 9 which enables the initial position of the member 1 to be set, for example with the aid of a tool such as a screwdriver.

The structures can of course be reversed, with the rearming member then having a lug mounted with a clearance in a notch of the member 4.

The rearming member 1 preferably defines wear indicating means.

The springs 6 and 7 may be coil springs or springs of rubber or a synthetic material, mounted in windows.

It will be noted that the spring 7 constitutes an arming spring, and that the spring 6 constitutes a release spring.

In a modified version, the arming member 1 may have axial lugs which penetrate with a predetermined clearance into apertures in the adjusting member 4, so as to define the loose coupling means.

In another modified version, the ramp means are defined by the diaphragm 24 which, for this purpose, has a corrugated configuration.

In a further modified version, the ramp means are formed between the diaphragm and the cover plate.

It will be appreciated that as the liners 30 become worn, the force of the diaphragm 24 increases in such a way that this increase in energy is made use of in order to arm the system.

I claim:

1. A friction clutch comprising; a reaction plate (13, 16) for rotation with a driving shaft, a friction wheel (14) which is adapted for rotation with said driving shaft and which carries friction liners (30) at its outer periphery, a pressure plate (20), axially acting resilient means (24), a cover plate (17) which is fastened on the reaction plate (13, 16), rotational coupling means (23) operatively interposed between the pressure plate (20) and an assembly consisting of the cover plate (7) and the reaction plate (13, 16), for coupling the pressure plate (20) to said assembly for rotation with, and for axial mobility with respect to the latter, wherein one of the plates consisting of the pressure plate (20) and the reaction plate (13, 16), referred to as the first plate, comprises two coaxial parts (13, 16; 20, 120), one of which is displaceable axially with respect to the other against the action of a wear compensating mechanism (11) interposed between said parts and comprising ramp means working between two members (4, 5), each of which is associated with a respective one of the said parts of the first plate (20; 13, 16), one of the latter being rotatable while the other is fixed against rotation, and a trigger (3) responsive to the state of wear of the friction liners (30), for controlling the initiation of movement of said parts of the first plate (13, 16), wherein said clutch includes a rotatable rearming member (1) associated with one of the parts of the first plate (13, 16; 20) and subjected to the action of locking means (2) which are controlled by the trigger (3), first circumferentially acting resilient means (6) and loose coupling means (8, 80) are interposed between the rearming member (1) and the rotatable member (4) of the wear compensating mechanism (11), the rearming member (1) is subjected to the action of second circumferentially acting resilient means (7) working against the first resilient means (6) and interposed operatively between the rearming member (1) and one of the parts of the first plate (13, 16; 20), and said second resilient means (7) exert on the rearming member (1) a torque which is greater than that exerted by the said first resilient means (6).

2. A clutch according to claim 1, wherein the locking means comprise a brake (2).

3. A clutch according to claim 2, wherein the locking means (2) are fastened on one of the parts of the first plate (13, 16), and have a resilient tongue (51) which is subjected to the action of the trigger (3).

4. A clutch according to claim 3, wherein the locking means (2) have a profiled portion for clamping the rearming member (1) between the latter and said part of the first plate.

5. A clutch according to claim 1, wherein the rearming member (1) is mounted for rotation on the rotatable member (4) of the wear compensating device (11).

6. A clutch according to claim 5, wherein the rearming member (1) surrounds said movable member (4) of the wear compensating mechanism.

7. A clutch according to claim 6, wherein the rearming member (1) has an internal notch (80) into which there penetrates, with a circumferential clearance, a lug (8) of the rotatable member (4) of the wear compensating device (11).

8. A clutch according to claim 1, wherein the first circumferentially acting resilient means (6) are mounted in notches (81, 82) formed in facing relationship with each other in the rearming member (1) and in the rotatable member (4) of the wear compensating mechanism (11), respectively.

9. A clutch according to claim 1, wherein the second resilient means (7) consist of an inclined coil spring which is anchored in the rearming member (1) and in the appropriate part (13, 120) of the first plate.

10. A clutch according to claim 1, wherein the reaction plate (13, 16) is in two parts, and in that the rearming member (1) and the wear compensating device (11) act between the two parts (13, 16) of the said reaction plate.

11. A clutch according to claim 10, wherein one of the parts consists of a support plate (13) while the other one of the parts 20 consists of a plate (16) constituting the reaction plate and having a friction surface to the appropriate friction liner (30).

12. A clutch according to claim 11, wherein the rearming member (1) is clamped between the support plate (13) and the locking means (2).

13. A clutch according to claim 12, wherein the reaction plate proper (16) has at its inner periphery a collar portion (160) for fixedly mounting the member of the wear compensating mechanism (11) that is fixed against rotation.

14. A clutch according to claim 13, wherein the components of the wear compensating mechanism (11) are centered by a member which is fixed on the support plate (13).

15. A clutch according to claim 9, wherein the pressure plate (20) is in two parts, and in that the rearming member (1) and the wear compensating device (11) work between the two parts 15, 120) of said pressure plate.

* * * * *